Oct. 27, 1925.

W. L. McGRATH 1,558,557

VELOCIPEDE AND THE LIKE

Original Filed April 27, 1922

Inventor
William L. McGrath,
By Mauro, Cameron, Lewis & Massie
Attorneys

Patented Oct. 27, 1925.

1,558,557

UNITED STATES PATENT OFFICE.

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK.

VELOCIPEDE AND THE LIKE.

Original application filed April 27, 1922, Serial No. 556,969. Divided and this application filed September 8, 1923. Serial No. 661,654.

*To all whom it may concern:*

Be it known that I, WILLIAM L. MC-GRATH, a citizen of the United States of America, and a resident of Elmira, New York, have invented new and useful Improvements in Velocipedes and the like, which invention is fully set forth in the following specification.

This invention relates to vehicles, such as velocipedes of the three-wheeled type, and is directed to subject-matter divided from my co-pending application, Serial Number 556,969, filed April 27, 1922, for velocipedes and the like.

It is a fact that velocipedes of this type, when turning corners, very readily upset, which fact frequently results in injury to the rider. It is common practice, when turning a corner on a two-wheeled velocipede, to counteract the centrifugal tendency to upset by tilting the vehicle so as to bring the center of gravity of rider and machine to a point where the force of gravity overcomes the centrifugal force. In this instance, the vehicle has a single supporting plane, extending in the direction of the line of travel, through the two supporting wheels. The cylindrical tires practically give a line support and tilting may be readily and safely effected.

A motor cycle, with side-car attached, has two parallel supporting planes, and a low center of gravity. If the side-car is rigidly attached on the left, the rider, in making a right-hand turn, can readily tilt the vehicle to counteract centrifugal force, about the line of support passing through the two tracking wheels. Since he is unable to tilt his machine for a left-hand turn with this arrangement, a pivotal connection has heretofore been devised whereby the rider can tilt the machine in either direction. In this case, however, the vehicle is supported in two parallel planes extending approximately in the direction of travel, and danger of upsetting is minimized. The problem presented by the motor cycle and side-car, regardless of the type of side-car connection, is thus the same as that of the two-wheeled velocipede.

The three-wheeled velocipede, on the other hand, is supported in three parallel planes passing through each of the three wheels. If the rider wishes to tilt this type of vehicle to counteract centrifugal force, when making a sharp turn to the right for example, he must bring the center of gravity of the moving mass to a single plane. This plane necessarily lies in the direction of the line passing through the points of contact with the supporting surface, of the front supporting wheel and the rear, right supporting wheel. This plane passes to the left, at a considerable angle, of the line of the direction of travel. The momentum, however, carries the moving mass in the original direction of movement, with the result that the vehicle pivots about the line of support and upsets. The triangular arrangement of the supporting wheels of a child's velocipede thus prevents the rider from tilting this type of vehicle when turning, and the unopposed centrifugal force often results in a fall; and if the velocipede is supplied with a brake, and many are thus equipped, application of the brake, at the time of turning a corner, still further increases the tendency to upset, so that the liability to overturning and possible injury is greatly increased.

The object of the present invention is to provide a three-wheeled device with means such that the rider will, with the same facility as with a two-wheeled device and with the minimum of danger to upsetting, naturally and instinctivey oppose the force of gravity in opposition to the upsetting tendency of centrifugal force, when the velocipede is turned sharply; the vehicle being normally and automatically maintained in an upright position when ridden in a straight course. Said automatic means insure its stable static equilibrium when standing alone or with a rider.

In order that the invention may be more readily understood, reference is made to the accompanying drawings which are designed merely as illustrations to assist in the description of the invention, and not as defining the limits thereof.

Figure 1:
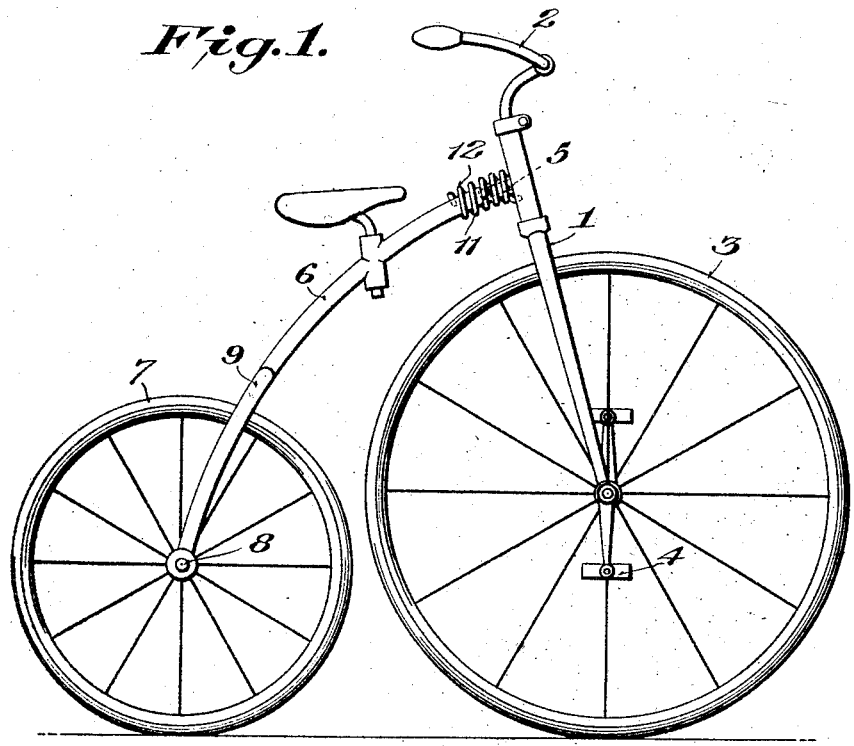
Fig. 1 is a side elevation of a velocipede illustrating one embodiment of the inventive idea.
Figure 2:
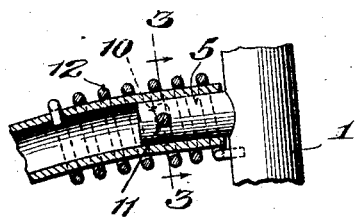
Fig. 2 is a detail sectional view of one form of connection which may be employed between the two parts of the velocipede frame.
Figure 3:
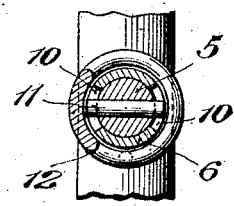
Fig. 3 is a cross section taken on line 3, 3 of Fig. 2.

Referring to the drawings, wherein like reference numerals indicate like parts, 1 is an upright frame member carrying the usual steering bars 2 at its upper end and a front wheel 3 and actuating pedals 4 at the extremity of its lower bifurcated end. Adjacent the upper end of frame member 1, and rigidly secured thereto in any suitable manner, is a rearwardly extending cylindrical projection 5 which extends loosely into the upper forward end of "backbone" or rear frame member 6. Rear wheels 7 are mounted on an axle 8 secured to the bifurcated end 9 of backbone 6 as in the ordinary type of three-wheeled velocipede.

Extending transversely through projection 5, adjacent the end thereof, and into slots 10 formed in rear frame member 6, is a pin 11 which prevents relative longitudinal movement between the frame members, but which allows of relative angular movement within the limits of slots 10. A coil spring 12, surrounding backbone 6, is secured to the latter at its after end and to front frame member 1 at its forward end in such a manner as to resist any relative angular movement of the two frame members.

By thus securing the frame member 1 to the after member 6 carrying the rear wheels, the rider can tilt the front wheel (and will naturally and instinctively do so), to counteract the centrifugal force encountered when turning a corner, thereby avoiding upsetting. Spring 12 resists this tilting and normally maintains front wheel 3 in an upright position.

For the purpose of clearness, only one embodiment of the inventive idea has been herein shown and described in detail, but it is to be expressly understood that this inventive idea is capable of being embodied in a variety of mechanical structures within the limits of the appended claims, and particularly is it to be understood that the invention may be used on three-wheeled vehicles other than velocipedes, said claims being intended to cover three-wheeled structures provided with means for safely counter-acting the upsetting tendency of centrifugal force by opposing the force of gravity with the same facility as in two-wheeled structures.

What is claimed is:—

1. A device of the class described comprising a rear frame member, a front frame member having pin and slot connection with said rear member, and resilient means for resisting relative angular movement of said frame members around a longitudinally extending axis.

2. In a three-wheeled vehicle, a front frame member having a rearwardly extending portion, a rear frame member telescopically engaging said portion, means having sliding engagement with one of said members for preventing relative longitudinal movement of said members, and means for resisting relative angular movement of said members.

3. In a three wheeled vehicle, the combination of a front frame member, a rear frame member telescopically engaging a portion of said front member, means for preventing relative lineal movement of said members, and means engaging each of said members for normally maintaining said front member in upright position.

4. In a three wheeled vehicle, the combination of a front frame member having a rearwardly extending projection, a rear frame member telescopically engaging said projection, a pin having engagement with said projection and having its ends extending into slots formed in said rear member, and a resilient member having engagement at one end with said rear member and at its opposite end with said front member for resisting relative angular movement of said members.

5. In a three wheeled vehicle, the combination of a front frame member, a rear frame member bifurcated at the rear end thereof, means connecting said members whereby said front member may be tilted around a longitudinally extending axis relative to said rear member, and resilient means surrounding a portion of said rear member for resisting tilting movement of said front member.

6. In a three-wheeled vehicle, the combination of a front frame member, a rear frame member, a helical spring secured to each of said frame members for resisting relative angular movement of said members around a longitudinally extending axis.

7. In a three-wheeled vehicle, the combination of a front frame member, a rear frame member telescopically engaging said front member, and resilient means for resisting relative angular movement of said frame members around a longitudinal axis.

8. In a vehicle, the combination of a frame comprising two sections, a longitudinal pivotal connection between said sections, and resilient means for resisting relative movement of said sections around the longitudinal pivot.

In testimony whereof I have signed this specification.

WILLIAM L. McGRATH.